US012777502B2

(12) United States Patent
Hahn et al.

(10) Patent No.: US 12,777,502 B2
(45) Date of Patent: Oct. 27, 2026

(54) METHOD AND DEVICE FOR ALLOCATING SIDELINK RESOURCES ON BASIS OF INTER-UE COORDINATION

(71) Applicants: HYUNDAI MOTOR COMPANY, Seoul (KR); KIA CORPORATION, Seoul (KR); Wonkwang University Center For Industry-Academy Cooperation, Iksan-si (KR)

(72) Inventors: Gene Back Hahn, Hwaseong-si (KR); Ui Hyun Hong, Hwaseong-si (KR); Hyuk Min Son, Iksan-si (KR)

(73) Assignees: HYUNDAI MOTOR COMPANY, Seoul (KR); KIA CORPORATION, Seoul (KR); Wonkwang, University Center For. Industry-Academy Cooperation, Iksan-si (KR)

( * ) Notice: Subject to any disclaimer, the term of this patent is extended or adjusted under 35 U.S.C. 154(b) by 435 days.

(21) Appl. No.: 18/218,761

(22) Filed: Jul. 6, 2023

(65) Prior Publication Data

US 2023/0362962 A1 Nov. 9, 2023

Related U.S. Application Data

(63) Continuation-in-part of application No. PCT/KR2022/000573, filed on Jan. 12, 2022.

(30) Foreign Application Priority Data

Jan. 13, 2021 (KR) ........................ 10-2021-0004819
Jan. 12, 2022 (KR) ........................ 10-2022-0004599

(51) Int. Cl.

| | |
|---|---|
| *H04W 72/40* | (2023.01) |
| *H04W 72/044* | (2023.01) |
| *H04W 72/541* | (2023.01) |

(52) U.S. Cl.

CPC ......... *H04W 72/40* (2023.01); *H04W 72/044* (2013.01); *H04W 72/541* (2023.01)

(58) Field of Classification Search

CPC ..... H04W 72/25; H04W 72/02; H04W 92/18; H04W 72/40; H04W 72/541;

(Continued)

(56) References Cited

U.S. PATENT DOCUMENTS 11,601,789 B2 * 3/2023 Panteleev ......... H04W 72/1263
12,641,572 B2 * 5/2026 Luo ....................... H04W 72/02

(Continued)

FOREIGN PATENT DOCUMENTS

EP 3295740 B1 1/2020
KR 10-2017-0080609 A 7/2017

(Continued)

OTHER PUBLICATIONS

3GPP, "NR SL Mode 2 enhancement for reliability improvement", 3GPP TSG RAN WG1 #102-e, RI-2006184, e-Meeting, Aug. 17-Aug. 28, 2020, 4 pages.

(Continued)

*Primary Examiner* — Allahyar Kasraian

(74) *Attorney, Agent, or Firm* — Morgan, Lewis & Bockius LLP

(57) ABSTRACT

Disclosed are a method and device for allocating sidelink resources on the basis of inter-UE coordination. An operation method of UE-B includes the steps of: transmitting, to first UE-A, a message for requesting resource allocation for sidelink communication; receiving, from the first UE-A, first resource aggregation information including the result of a first resource sensing operation performed in the first UE-A; selecting a transmission resource in consideration of at least one of a first resource aggregation, indicated by the first resource aggregation information, or a third resource aggre- (Continued)

gation, determined by a third resource sensing operation performed in the UE-B; and performing the sidelink communication by using the transmission resource.

14 Claims, 9 Drawing Sheets

(58) Field of Classification Search
CPC ..... H04W 72/044; H04W 4/46; H04W 76/14; H04W 72/20; H04W 28/26; H04W 72/04; H04W 72/563; H04W 72/51; H04W 72/566; H04W 88/04; H04W 76/23
See application file for complete search history.

(56) References Cited

U.S. PATENT DOCUMENTS

| | | | | |
|---|---|---|---|---|
| 2017/0280469 | A1 | 9/2017 | Park et al. | |
| 2019/0222981 | A1 | 7/2019 | Lee et al. | |
| 2020/0229145 | A1 | 7/2020 | Kang et al. | |
| 2022/0046663 | A1* | 2/2022 | Yang | H04W 28/26 |
| 2022/0086803 | A1* | 3/2022 | Li | H04W 72/0453 |
| 2022/0103320 | A1* | 3/2022 | Lee | H04L 1/00 |
| 2023/0087401 | A1* | 3/2023 | Shin | H04W 72/20 370/329 |
| 2023/0141004 | A1* | 5/2023 | Hong | H04W 72/1263 370/311 |

FOREIGN PATENT DOCUMENTS

| | | | |
|---|---|---|---|
| KR | 10-2019-0003774 | A | 1/2019 |
| KR | 10-2020-0086920 | A | 7/2020 |
| WO | 2020/022781 | A1 | 1/2020 |
| WO | 2020/060276 | A1 | 3/2020 |

OTHER PUBLICATIONS

3GPP, "Discussion on RAN2 scope for resource allocation enhancement", 3GPP TSG-RAN WG2 Meeting #112, Electronic, R2-2010047, Nov. 2-13, 2020, 4 pages.
3GPP, "On Resource Allocation Mode 2 Enhancement for NR Sidelink", 3GPP TSG-RAN WG2 Meeting #112 electronic, R2-20010144, Online, Nov. 2-13, 2020, 5 pages.
International Search dated Apr. 29, 2022 cited in International Patent Application No. PCT/KR2022/000573 (w/English translation).
"Analysis of Potential Sidelink Enhancements Targeting Mode 2 Reliability and Latency," 3GPP TSG RAN WG1 Meeting #103-E, e-Meeting, Intel Corporation, Oct. 26 through Nov. 13, 2020 (R1-2008999).
"Feature lead summary for AI 8.11.2.2 Feasibility and benefits for mode 2 enhancements," 3GPP TSG RAN WG1 #103-e, e-Meeting, LG Electronics, Oct. 26 through Nov. 13, 2020 (R1-2009788).
"WID revision: NR sidelink enhancement," 3GPP TSG RAN Meeting #88e, Electronic Meeting, LG Electronics, Jun. 29 through Jul. 3, 2020 (RP-201385).

* cited by examiner

METHOD AND DEVICE FOR ALLOCATING SIDELINK RESOURCES ON BASIS OF INTER-UE COORDINATION

CROSS-REFERENCE TO RELATED APPLICATION

The present application is a continuation-in-part of currently pending International Patent Application No. PCT/KR2022/000573, filed Jan. 12, 2022, which claims priority to Korean Patent Application No. 10-2021-0004819, filed Jan. 13, 2021, and Korean Patent Application No. 10-2022-0004599, filed Jan. 12, 2022, the entire contents of which is incorporated herein for all purposes by this reference.

BACKGROUND OF THE PRESENT DISCLOSURE

Field of the Present Disclosure

The present disclosure relates to a sidelink communication technique, and more particularly, to a technique for allocating sidelink resources based on inter-user equipment (UE) coordination.

Description of Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, resource allocation schemes in sidelink communication may be classified into a mode 1 and a mode 2. When the mode 1 is used, a base station may transmit resource allocation information to a transmitting UE, and the transmitting UE may perform sidelink communication based on the resource allocation information received from the base station. When the mode 2 is used, the transmitting UE may determine transmission resource(s) by performing a resource sensing operation and/or resource selection operation, and may perform sidelink communication using the transmission resource(s). Due to the resource sensing operation and/or resource selection operation, power consumption of the transmitting UE may increase. A transmitting UE with limitations on power use and/or a transmitting UE with limitations on resource sensing capability may not be able to perform a resource sensing operation and/or resource selection operation. In order to solve the above-described problems, methods for assisting a resource sensing operation and/or resource selection operation of the transmitting UE are required.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and an apparatus for allocating sidelink resources based on inter-UE coordination in sidelink communication.

An operation method of a UE-B, according to various exemplary embodiments of the present disclosure for achieving the above-described objective, may include: transmitting, to a first UE-A, a message requesting resource allocation for sidelink communication; receiving, from the first UE-A, first resource set information including a result of a first resource sensing operation performed by the first UE-A; selecting a transmission resource in consideration of at least one of a first resource set indicated by the first resource set information or a third resource set determined by a third resource sensing operation performed by the UE-B; and performing the sidelink communication using the transmission resource.

The operation method may further include: receiving, from a second UE-A, second resource set information including a result of a second resource sensing operation performed by the second UE-A, wherein the second resource sensing operation may be triggered by a base station that has received the message from the first UE-A, and the transmission resource may be selected in consideration of at least one of the first resource set, a second resource set indicated by the second resource set information, or the third resource set.

The message may include at least one of an indicator requesting the resource allocation, an identifier of the UE-B, information on resources allocated to the UE-B, a threshold used for the first resource sensing operation, information requesting reporting of preferred resource(s), or information requesting reporting of non-preferred resource(s).

The message may be transmitted to the base station through the first UE-A, and the first resource sensing operation may be triggered by first resource sensing information generated by the base station based on the message.

The first resource sensing information may be transmitted from the base station to the first UE-A, and the first resource sensing information may include at least one of an indicator indicating whether to perform the first resource sensing operation, information on resources on which the first resource sensing operation is performed, a first threshold used to determine preferred resource(s), or a second threshold used to determine non-preferred resource(s).

The first resource set information may include at least one of resource pool (RP) resource information indicating a resource pool in which the first resource sensing operation has been performed, time-frequency resource information indicating time-frequency resources on which the first resource sensing operation has been performed within the resource pool indicated by the RP resource information, a preference indicator indicating that the time-frequency resources indicated by the time-frequency resource information are preferred resource(s), a non-preference indicator indicating that the time-frequency resources indicated by the time-frequency resource information are non-preferred resource(s), a first threshold used to determine the preferred resource(s), or a second threshold used to determine the non-preferred resource(s).

A first mapping relationship between the preference indicator and the first threshold and a second mapping relationship between the non-preference indicator and the second threshold may be configured, and the first threshold may be set to be distinguished from the second threshold.

When the first resource set information not including the preference indicator and the non-preference indicator includes the first threshold, the time-frequency resources indicated by the first resource set information may be determined as the preferred resource(s), and when the first resource set information not including the preference indicator and the non-preference indicator includes the second threshold, the time-frequency resources indicated by the first resource set information may be determined as the non-preferred resource(s).

An operation method of a UE-B, according to various exemplary embodiments of the present disclosure for achieving the above-described objective, may include: transmitting, to a base station, a message requesting resource allocation for sidelink communication; receiving, from a first UE-A, first resource set information including a result of performing a first resource sensing operation of the first UE-A, the first resource sensing operation being triggered by the base station; selecting a transmission resource in consideration of at least one of a first resource set indicated by the first resource set information or a third resource set determined by a third resource sensing operation performed by the UE-B; and performing the sidelink communication using the transmission resource.

The operation method may further include: receiving, from a second UE-A, second resource set information including a result of a second resource sensing operation performed by the second UE-A, the second resource sensing operation being triggered by the base station, wherein the transmission resource may be selected in consideration of at least one of the first resource set, a second resource set indicated by the second resource set information, or the third resource set.

The message may include at least one of an indicator requesting the resource allocation, an identifier of the UE-B, information on resources allocated to the UE-B, a threshold used for the first resource sensing operation, information requesting reporting of preferred resource(s), or information requesting reporting of non-preferred resource(s).

The first resource sensing operation may be triggered by first resource sensing information generated by the base station based on the message, the first resource sensing information may be transmitted from the base station to the first UE-A, and the first resource sensing information may include at least one of an indicator indicating whether to perform the first resource sensing operation, information on resources on which the first resource sensing operation is performed, a first threshold used to determine preferred resource(s), or a second threshold used to determine non-preferred resource(s).

The first resource set information may include at least one of resource pool (RP) resource information indicating a resource pool on which the first resource sensing operation has been performed, time-frequency resource information indicating time-frequency resources on which the first resource sensing operation has been performed within the resource pool indicated by the RP resource information, a preference indicator indicating that the time-frequency resources indicated by the time-frequency resource information are preferred resource(s), a non-preference indicator indicating that the time-frequency resources indicated by the time-frequency resource information are non-preferred resource(s), a first threshold used to determine the preferred resource(s), or a second threshold used to determine the non-preferred resource(s).

The first threshold mapped to the preference indicator may be set to be distinguished from the second threshold mapped to the non-preference indicator; and when the first resource set information not including the preference indicator and the non-preference indicator includes the first threshold, the time-frequency resources indicated by the first resource set information may be determined as the preferred resource(s), and when the first resource set information not including the preference indicator and the non-preference indicator includes the second threshold, the time-frequency resources indicated by the first resource set information may be determined as the non-preferred resource(s).

An operation method of a UE-A, according to various exemplary embodiments of the present disclosure for achieving the above-described objective, may include: receiving, from a base station, resource sensing information requesting to perform a resource sensing operation for resource allocation of a UE-B; performing the resource sensing operation based on the requesting of the base station; generating resource set information based on a result of the resource sensing operation; and transmitting the resource set information to the UE-B, wherein the resource set information includes information indicating preferred resource(s) for resource allocation of the UE-B or information indicating non-preferred resource(s) for resource allocation of the UE-B.

The operation method may further include: receiving, from the UE-B, a message requesting resource allocation for sidelink communication, before receiving the resource sensing information; and transmitting the message to the base station, wherein the resource sensing information is generated based on the message.

The message may include at least one of an indicator requesting the resource allocation, an identifier of the UE-B, information on resource(s) allocated to the UE-B, a threshold used for the first resource sensing operation, information requesting reporting of the preferred resource(s), or information requesting reporting of the non-preferred resource(s).

The resource set information may be transmitted to the UE-B when a ratio of available resources identified by the resource sensing operation is greater than or equal to a threshold.

The resource sensing information may include at least one of an indicator indicating whether to perform the resource sensing operation, information on resources on which the resource sensing operation is performed, a first threshold used to determine the preferred resource(s), or a second threshold used to determine the non-preferred resource(s).

The resource set information may include at least one of resource pool (RP) resource information indicating a resource pool on which the resource sensing operation has been performed, time-frequency resource information indicating time-frequency resources on which the resource sensing operation has been performed within the resource pool indicated by the RP resource information, a preference indicator indicating that the time-frequency resources indicated by the time-frequency resource information are the preferred resource(s), a non-preference indicator indicating that the time-frequency resources indicated by the time-frequency resource information are the non-preferred resource(s), a first threshold used to determine the preferred resource(s), or a second threshold used to determine the non-preferred resource(s).

According to an exemplary embodiment of the present disclosure, the UE-B may transmit a message requesting resource allocation to the UE-A or base station, and may receive a result of a resource sensing operation performed by the UE-A from the UE-A. The UE-B may determine transmission resource(s) in consideration of a result of the resource sensing operation of the UE-A, and may perform sidelink communication using the transmission resource(s). Accordingly, since the UE-B can perform sidelink communication without performing a resource sensing operation, power consumption of the UE-B can be reduced. In addition, regardless of the UE-B's resource sensing capability, the UE-B can perform sidelink communication.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
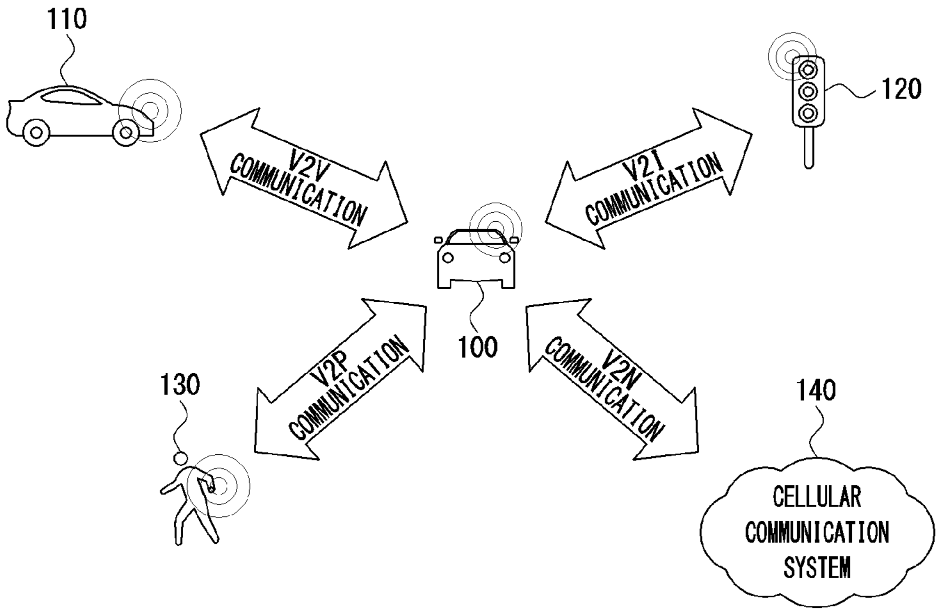
FIG. 1 is a conceptual diagram illustrating V2X communication scenarios.

It may be understood that the appended drawings are not necessarily to scale, presenting a somewhat simplified representation of various features illustrative of the basic principles of the present disclosure. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present disclosure(s) will be described in conjunction with exemplary embodiments, it will be understood that the present description is not intended to limit the present disclosure(s) to those exemplary embodiments. On the contrary, the present disclosure(s) is/are intended to cover not only the exemplary embodiments, but also various alternatives, modifications, equivalents and other embodiments, which may be included within the spirit and scope of the present disclosure as defined by the appended claims.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In exemplary embodiments of the present disclosure, '(re)transmission' may refer to 'transmission', 'retransmission', or 'transmission and retransmission', '(re)configuration' may refer to 'configuration', 'reconfiguration', or 'configuration and reconfiguration', '(re)connection' may refer to 'connection', 'reconnection', or 'connection and reconnection', and '(re)access' may refer to 'access', 're-access', or 'access and re-access'.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'include' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the present disclosure, to facilitate the entire understanding of the present disclosure, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In the present case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
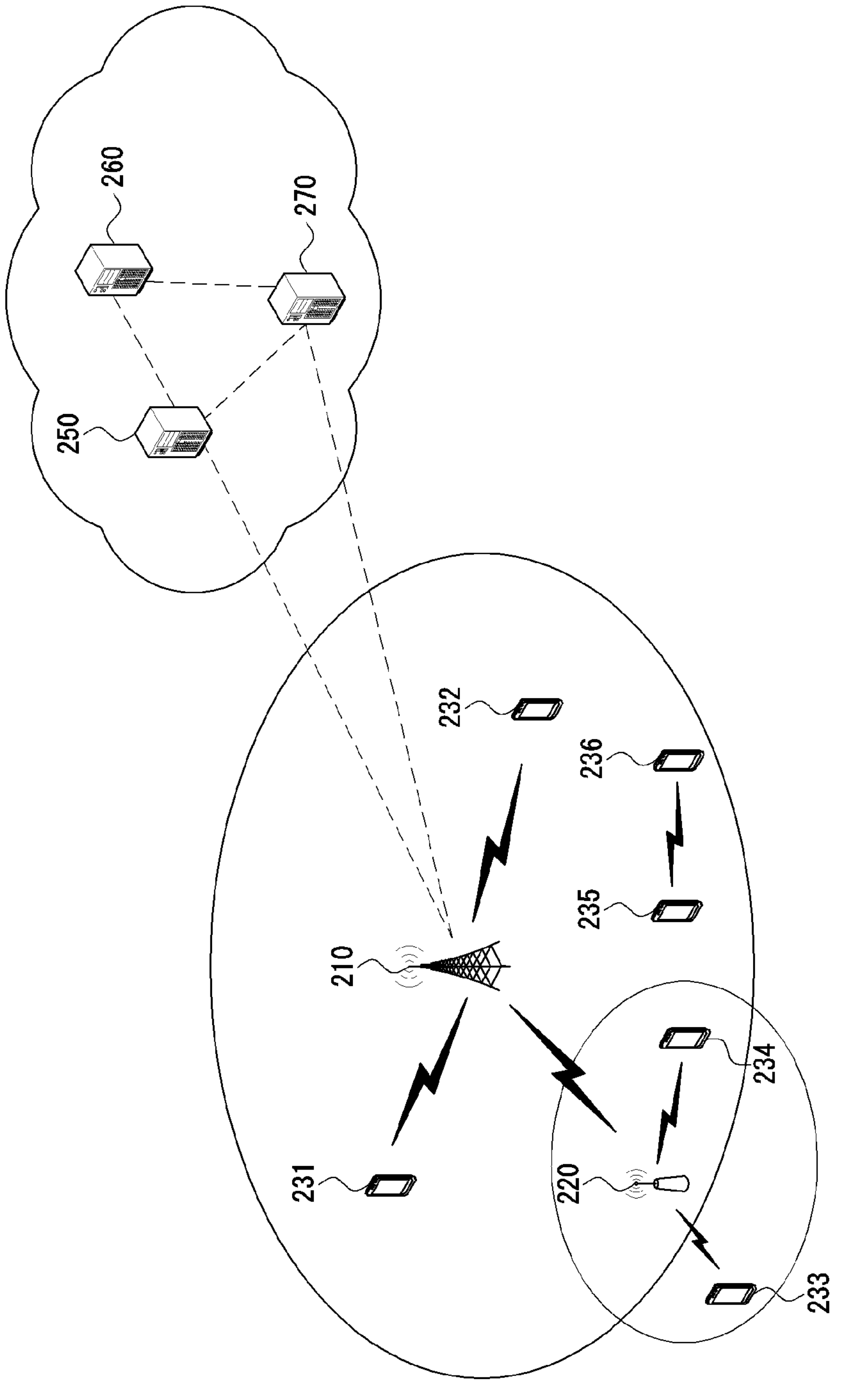
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231, 232, 233, 234, 235 and 236, and the like. The UEs 231, 232, 233, 234, 235 and 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) including the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) including the cellular communication system may be configured as follows.

Figure 3:
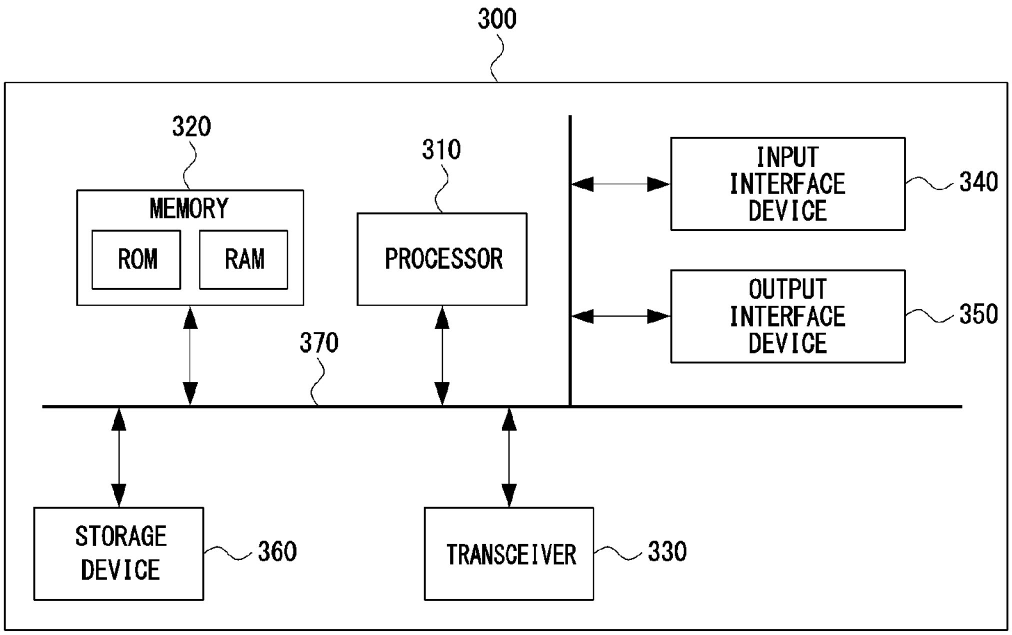
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may include at least one processor 310, a memory 320, and a transceiver 330 connected to a network for performing communications. Also, the communication node 300 may further include an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

Herein, the processor 310 and the memory 320 may be implemented as separate semiconductor circuits. Alternatively, the processor 310 and the memory 320 may be implemented as a single integrated semiconductor circuit. The processor 310 may embody one or more processor(s).

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231, 232, 233, 234, 235 and 236 and the relay 220, and may transmit signals received from the UEs 231, 232, 233, 234, 235 and 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231, 232, 233, 234, 235 and 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
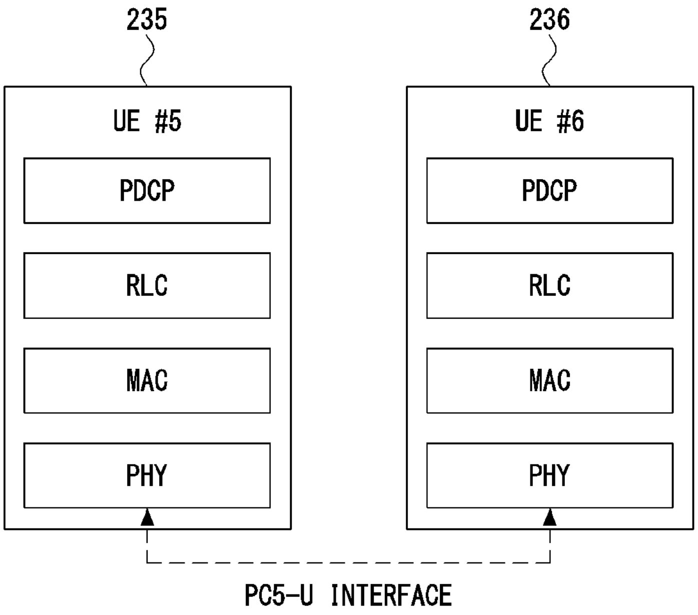
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
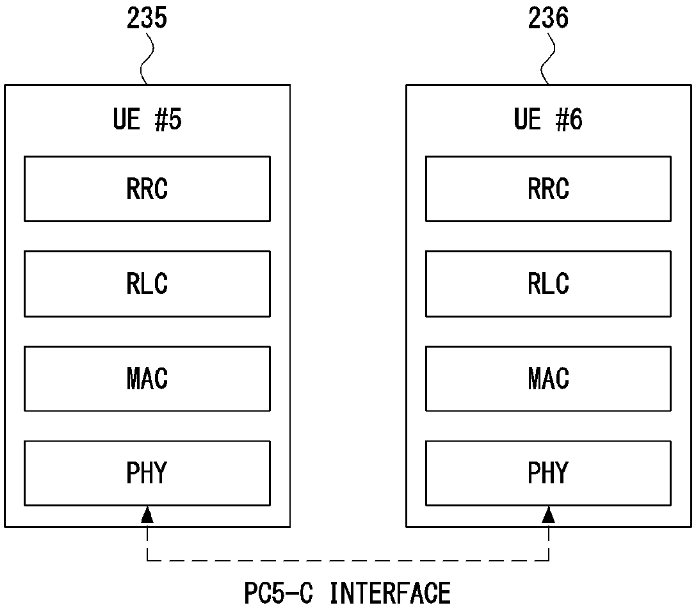
FIG. 5 is a block diagram illustrating a first exemplary embodiment of a control plane protocol stack of a UE performing sidelink communication.
Figure 6:
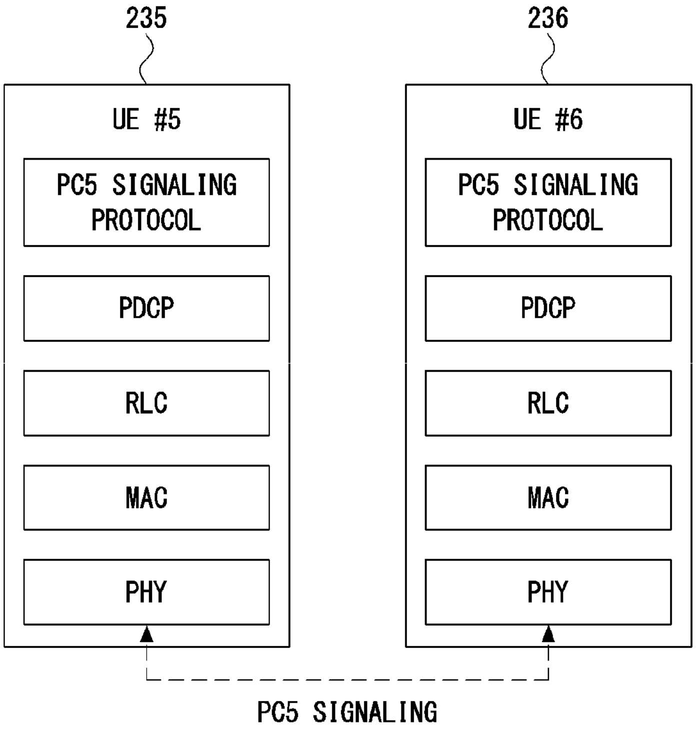
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIG. 5 and FIG. 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A and a SCI format 2-B.

The 1st-stage SCI may include or more information elements among priority information, frequency resource assignment information, time resource assignment information, resource reservation period information, demodulation reference signal (DMRS) pattern information, 2nd-stage SCI format information, a beta offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

Meanwhile, the UE may perform sidelink communication based on a mode 2 (e.g., sidelink TM 2 or 4 defined in Table 2). In this case, sidelink transmissions may collide due to a hidden node problem, an exposed node problem, a half-duplex operation problem, and/or the like. To solve this problem, an inter-UE coordination operation may be performed. When the inter-UE coordination operation is supported, a UE-A may transmit resource set information to a UE-B, and the UE-B may perform a resource sensing operation and/or a resource selection operation in consideration of the resource set information. Alternatively, the UE-B may perform a resource sensing operation and/or a resource selection operation without considering the resource set information. The resource set information may be referred to as coordination information. The resource set information may include information on preferred resource(s) and/or non-preferred resource(s) for transmission of the UE-B.

Figure 7:
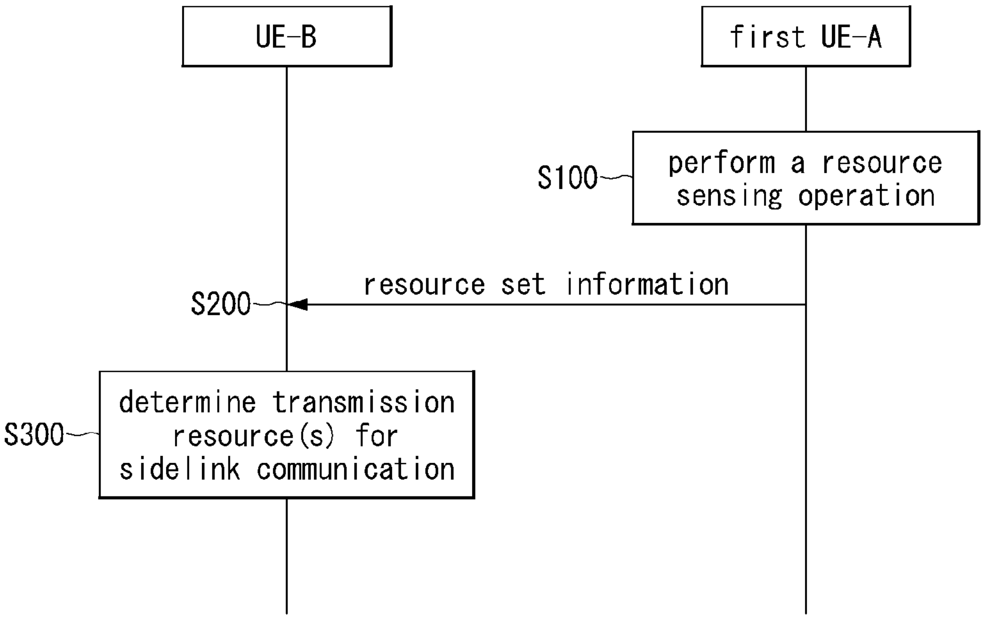
FIG. 7 is a sequence chart illustrating a first exemplary embodiment of a method for allocating sidelink resources based on inter-UE coordination.

FIG. 7 is a sequence chart illustrating a first exemplary embodiment of a method for allocating sidelink resources based on inter-UE coordination.

As shown in FIG. 7, a communication system may include a first UE-A and a UE-B. One or more UE-As (e.g., first UE-A, second UE-A, and the like) may exist within the communication system. The first UE-A may be the UE 235 shown in FIG. 2, and the UE-B may be the UE 236 shown in FIG. 2. Each of the first UE-A and the UE-B may be configured identically or similarly to the communication node 300 shown in FIG. 3. The first UE-A and the UE-B may support the protocol stacks shown in FIG. 4, FIG. 5 and FIG. 6.

The first UE-A may perform a resource sensing operation (S100). In the step S100, the first UE-A may determine available resource(s) (e.g., preferred resource(s)) and/or unavailable resource(s) (e.g., non-preferred resource(s)) based on a result of the resource sensing operation. In exemplary embodiments, a resource may mean a resource set. The first UE-A may generate resource set information including information on the preferred resource(s) and/or information on the non-preferred resource(s), and may transmit the resource set information to the UE-B (S200). The resource set information may include all or part of information elements obtained through the resource sensing operation. The resource set information may include time resource information and/or frequency resource information. In the step S200, the first UE-A may transmit, to the UE-B, information required for resource determination (e.g., allocation, selection) and/or information assisting resource determination at the UE-B as well as the resource set information.

The UE-B may receive the resource set information from the first UE-A. The UE-B may determine transmission resource(s) in consideration of the resource set information or without consideration of the resource set information (S300). In the step S300, the UE-B may determine transmission resource(s) by performing a resource sensing operation and/or resource selection operation. For example, the UE-B may determine transmission resource(s) by performing a resource selection operation in consideration of the resource set information without performing a resource sensing operation. The UE-B may perform sidelink communication using the transmission resource(s). In addition to the first UE-A, the second UE-A may transmit resource set information to the UE-A. For example, the second UE-A may perform the steps S100 and S200. The first UE-A and the second UE-A may independently perform the steps S100 and S200.

The resource set information generated by the first UE-A may be referred to as 'first resource set information', and the resource set information generated by the second UE-A may be referred to as 'second resource set information'. The UE-B may receive the first resource set information and the second resource set information. The UE-B may perform the step S300 in consideration of at least one of the first resource set information and the second resource set information. Alternatively, the UE-B may perform the step S300 without considering the first resource set information and the second resource set information.

[Exemplary Embodiments of the step S100 shown in FIG. 7]

Figure 8A:
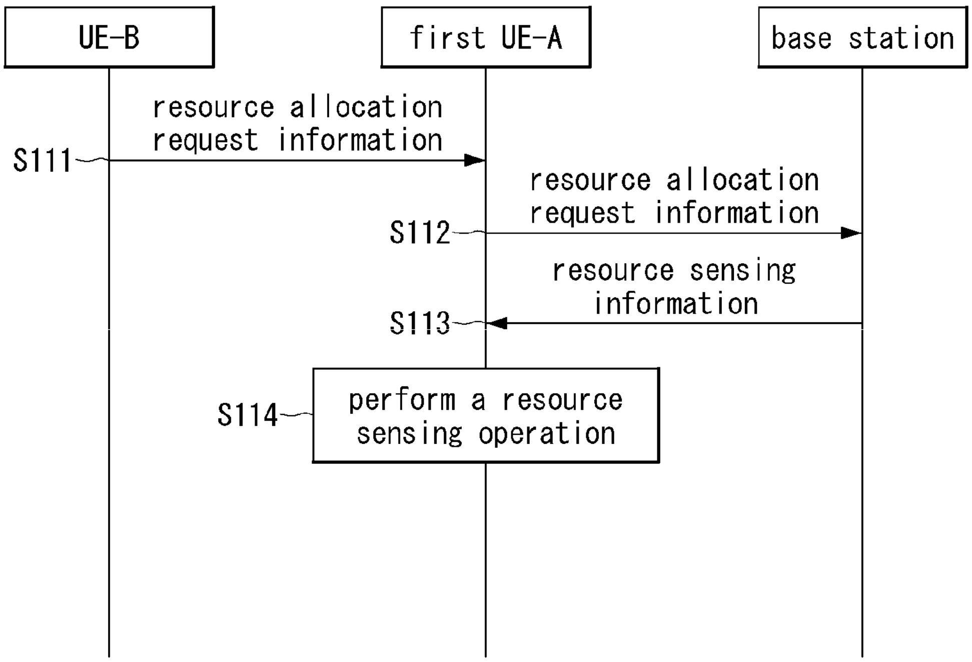
FIG. 8A is a sequence chart illustrating a first exemplary embodiment of the step S100 shown in FIG. 7.

FIG. 8A is a sequence chart illustrating a first exemplary embodiment of the step S100 shown in FIG. 7.

As shown in FIG. 8A, the step S100 may include steps S111, S112, S113, and S114. The first UE-A may be located within a coverage of a base station. That is, communication between the first UE-A and the base station may be performed. The first UE-A may perform sidelink communication with the UE-B through a sidelink.

The UE-B may transmit a message including information requesting resource allocation (i.e., resource allocation request information) to the first UE-A (S111). In addition, the message transmitted in the step S111 may further include an ID of the UE-B (i.e., UE-B ID) and/or information on resource(s) (e.g., resource pool (RP) information) allocated to the UE-B. The resource allocation request information (e.g., information element(s) included in the message) may be transmitted using at least one of higher layer signaling (e.g., MAC control element (CE)), PSCCH, PSSCH, or PSFCH. "The resource allocation request information (e.g., information element(s) included in the message) is transmitted through a PSCCH" may mean "first-stage SCI includes the resource allocation request information". "The resource allocation request information (e.g., information element(s) included in the message) is transmitted through a PSSCH" may mean "second-stage SCI includes the resource allocation request information". When the resource allocation request information (e.g., information element(s) included in the message) is transmitted through a PSFCH, the first UE-A may be a transmitting UE transmitting data to the UE-B, and the UE-B may perform a role of a receiving UE receiving the data from the first UE-A and a role of a transmitting UE transmitting data to another UE.

The first UE-A may receive a message including the resource allocation request information from the UE-B. The message received from the UE-B may further include the UE-B ID and/or the information on resource(s) allocated to the UE-B. The first UE-A may transmit a message including the resource allocation request information of the UE-B to the base station (S112). In addition, the message transmitted in the step S112 may further include the UE-B ID and/or the information on resource(s) allocated to the UE-B. The resource allocation request information (e.g., information element(s) included in the message) may be transmitted through a Uu link between the first UE-A and the base station. For example, the resource allocation request information (e.g., information element(s) included in the message) may be transmitted using at least one of higher layer signaling (e.g., RRC message, MAC CE), PUCCH, or PUSCH. The message transmitted in the steps S111 and S112 described above may include one or more information elements defined in Table 3 below.

TABLE 3

| Information elements |
|---|
| Resource allocation request information (e.g., indicator requesting resource allocation) |
| ID of UE-B |
| Information on resource(s) allocated to UE-B |

The base station may receive the resource allocation request information of the UE-B, UE-B ID, and/or information on resource(s) allocated to the UE-B from the first UE-A. The base station may generate resource sensing information based on the information element(s) received from the first UE-A. The resource sensing information may include one or more information elements defined in Table 4 below.

TABLE 4

| |
|---|
| Information elements |
| Indicator indicating whether to perform a resource sensing operation |
| Information on resources on which the resource sensing operation is to be performed |
| A threshold used to determine a use state of resource(s) |

The information on resource(s) on which the resource sensing operation is to be performed may include time resource information and/or frequency resource information. The time resource information may be configured in units of symbols, mini-slots, slots, or subframes. The time resource information may be expressed as an offset from a reference resource. The frequency resource information may be configured in units of subcarriers, subchannels, or physical resource blocks (PRBs). The frequency resource information may be expressed as an offset from a reference resource. The information on resource(s) on which the resource sensing operation is to be performed may indicate one or more RPs. The threshold used to determine a resource use state may be a received signal strength or received signal quality threshold.

The base station may transmit the resource sensing information to the first UE-A (S113). The resource sensing information may be transmitted through a Uu link between the base station and the first UE-A. For example, the resource sensing information may be transmitted using at least one of higher layer signaling (e.g., RRC message, MAC CE), PDCCH, or PDSCH. The base station may instruct (e.g., request) the first UE-A to perform a resource sensing operation in an RP configured in the UE-B and/or another RP not configured in the UE-B.

The first UE-A may receive the resource sensing information from the base station, and may identify information element(s) included in the resource sensing information (e.g., information element(s) defined in Table 4). The first UE-A may perform a resource sensing operation based on the information element(s) included in the resource sensing information (S114). That is, the resource sensing operation of the first UE-A may be triggered by the base station. When the indicator indicates not to perform the resource sensing operation, the first UE-A may not perform the resource sensing operation. When the indicator indicates to perform the resource sensing operation, the first UE-A may perform the resource sensing operation on the resource(s) indicated by the base station. The resources indicated by the base station may belong to an RP configured in the UE-B and/or another RP not configured in the UE-B. The first UE-A may compare a result of the resource sensing operation (e.g., received signal strength and/or received signal quality) with the threshold indicated by the base station. When a received signal strength at a first resource is greater than or equal to the threshold, the first UE-A may determine that the first resource is used by another communication node. That is, the first UE-A may determine the first resource as a non-preferred resource. On the other hand, when the received signal strength at the first resource is less than the threshold, the first UE-A may determine that the first resource is not used by another communication node. That is, the first UE-A may determine the first resource as a preferred resource.

Figure 8B:
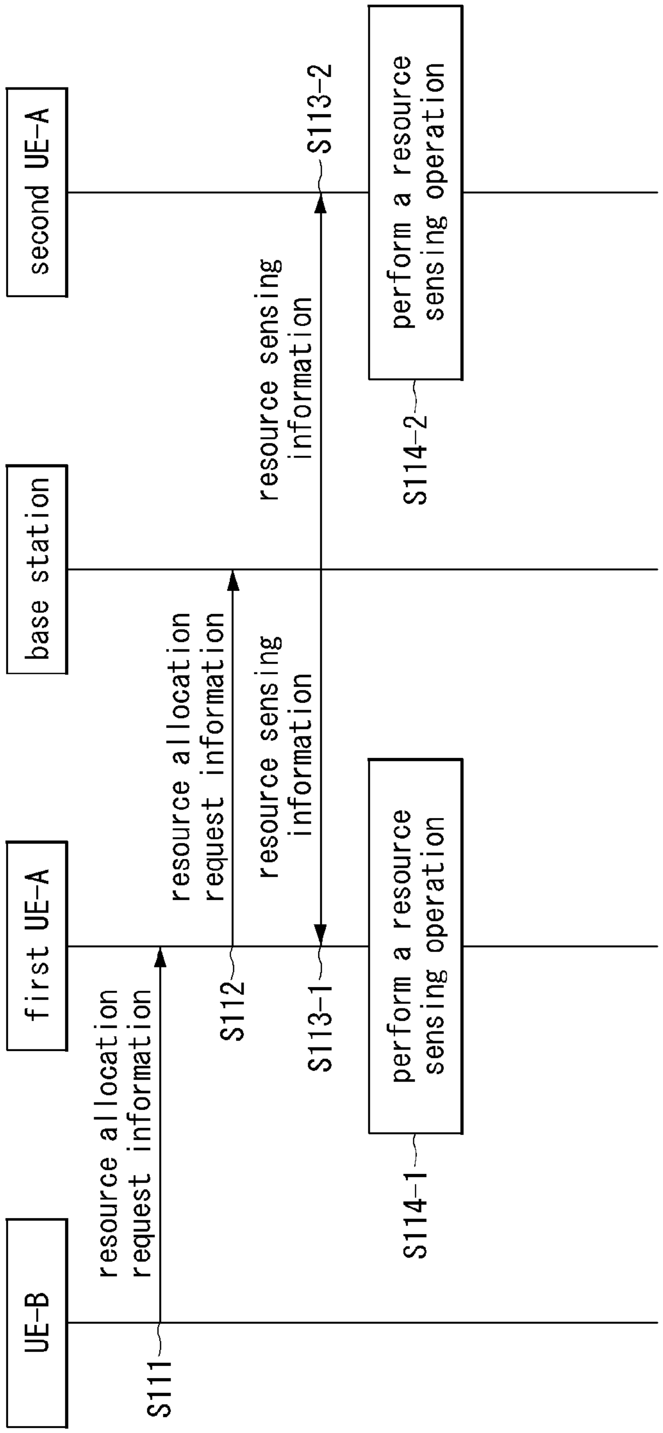
FIG. 8B is a sequence chart illustrating a second exemplary embodiment of the step S100 shown in FIG. 7.

FIG. 8B is a sequence chart illustrating a second exemplary embodiment of the step S100 shown in FIG. 7.

As shown in FIG. 8B, steps S111, S112, S113-1, and S114-1 shown in FIG. 8B may be performed identically or similarly to the steps S111, S112, S113, and S114 shown in FIG. 8A. The base station may transmit resource sensing information for resource allocation of the UE-B to not only the first UE-A but also the second UE-A (S113-1 and S113-2). In this case, the second UE-A not receiving the request allocation request information of the UE-B may also perform a resource sensing operation for resource allocation of the UE-B. The resource sensing information transmitted to the first UE-A may be the same as or similar to the resource sensing information transmitted to the second UE-A. The resource sensing information transmitted to each of the first UE-A and the second UE-A may include one or more information elements defined in Table 4.

The second UE-A may perform a resource sensing operation based on the resource sensing information (S114-2). The step S114-2 may be performed identically or similarly to the step S114 shown in FIG. 8A. The first resource set information as a result of the resource sensing operation in the first UE-A and/or the second resource set information as a result of a resource sensing operation in the second UE-A may be transmitted to the UE-B. The first resource set information and/or the second resource set information may be transmitted in the same or similar manner to the step S200 shown in FIG. 7.

Meanwhile, the base station may determine one or more UE-As (e.g., first UE-A and second UE-A) to perform resource sensing operations for resource allocation of the UE-B, and may transmit resource sensing information indicating (e.g., requesting) to perform resource sensing operations to the determined one or more UE-As. According to the above-described operations, the base station may designate specific UE-A(s) that assist resource allocation of the UE-B. When the number of specific UE-A(s) that assist resource allocation of the UE-B is one, the exemplary embodiment shown in FIG. 8A may be performed. When the number of specific UE-A(s) that assist resource allocation of the UE-B is two or more, the exemplary embodiment shown in FIG. 8B may be performed.

In the procedure for selecting UE-A(s) performing resource sensing operations for resource allocation of the UE-B, the base station may determine UE(s) performing resource sensing operations in the same RP (e.g., the same time resource and/or the same frequency resource) as that of the UE-B as the UE-A(s). Alternatively, in order to provide various information, the base station may determine UE(s) performing resource sensing operations in a different RP (e.g., different time resource and/or different frequency resource) from that of the UE-B to as the UE-A(s). Alternatively, the base station may determine UE(s) located within an area close to the UE-B as the UE-A(s). Alternatively, the base station may determine the UE-A(s) for a specific purpose based on information received from UE(s), and may trigger the determined UE-A(s) to perform resource sensing operations for resource allocation of the UE-B.

The triggered UE-A(s) may perform the resource sensing operations. When a result of the resource sensing operations does not satisfy a preconfigured condition, the UE-A(s) may not transmit the result of the resource sensing operations (e.g., resource set information) to the UE-B. The preconfigured condition may be configured to the UE-A(s) by the base station through higher layer signaling and/or downlink control information (DCI). Alternatively, when the base station triggers the UE-A(s) to perform the resource sensing operations, the base station may inform the UE-A(s) of the preconfigured condition. The above-described operations may be equally applied, extended, or modified to an exemplary embodiment in which a plurality of UE-As perform resource sensing operations.

In the exemplary embodiment shown in FIG. 8B, a plurality of UE-As (e.g., first UE-A and second UE-B) may perform resource sensing operations. Each of the plurality of UE-As may transmit a result of the resource sensing operation (e.g., resource set information) to the UE-B when the result of the resource sensing operation satisfies a preconfigured condition. The preconfigured condition may be configured to the plurality of UE-As by the base station through higher layer signaling and/or DCI. For example, when a ratio of available resources (or the size of available resources) as the result of the resource sensing operation is greater than or equal to a threshold, the UE-A may transmit the resource set information to the UE-B. The threshold may be the ‘threshold used to determine a resource use state’ defined in Table 4. The ratio of available resources may be defined based on a channel busy ratio (CBR) and/or a channel occupancy ratio (CR). Alternatively, the ratio of available resources may be defined as a ratio of resources determined as available resources among all resources on which the resource sensing operation has been performed.

The threshold used to determine a resource use state (e.g., a threshold of a received signal strength or a threshold of a received signal quality), time resources (e.g., time resource range) on which the resource sensing operation is performed, frequency resources (e.g., frequency resource range) on which the resource sensing operation is performed, and/or RP(s) on which the resource sensing operation is performed may be independently configured for each of the plurality of UE-As. The time resources (e.g., time resource range) on which the resource sensing operation is performed, the frequency resources (e.g., frequency resource range) on which the resource sensing operation is performed, and/or the RP(s) on which the resource sensing operation is performed may be indicated by the ‘information on resource(s) on which the resource sensing operation is to be performed’ defined in Table 4. The resource sensing information for the first UE-A may be configured differently from the resource sensing information for the second UE-A. Alternatively, the resource sensing information for the first UE-A may be configured identically to the resource sensing information for the second UE-A.

Meanwhile, in the exemplary embodiment shown in FIGS. 8A and/or 8B, the plurality of UE-Bs may transmit resource allocation request information to the UE-A(s). Each of the UE-A(s) may transmit the resource allocation request information of one or more UE-Bs to the base station. For example, the first UE-A may transmit resource allocation request information of a first UE-B and resource allocation request information of a second UE-B to the base station. The base station may receive the resource allocation request information of the first UE-B and the resource allocation request information of the second UE-B from the first UE-A. In this case, the base station may select one or more UE-As to perform resource sensing operations for the UE-B(s), and trigger the selected one or more UE-As to perform the resource sensing operations for the UE-B(s).

Alternatively, the base station may select one or more UE-As to transmit results of the resource sensing operations for the UE-B(s), and instruct the selected one or more UE-As to transmit the results of the previously-performed resource sensing operations to the UE-B(s). In this case, the first UE-A may transmit the result of the previously-performed resource sensing operation (e.g., resource set information) to the UE-B(s) without performing a resource sensing operation. Here, the resource sensing information transmitted from the base station to the first UE-A may include information (e.g., IDs) of the UE-B(s) (e.g., one or more UE-Bs selected by the base station) having transmitted the resource allocation request information. The first UE-A may transmit the result of the previously-performed resource sensing operation (e.g., resource set information) to the UE-B(s) indicated by the resource sensing information.

Figure 9A:
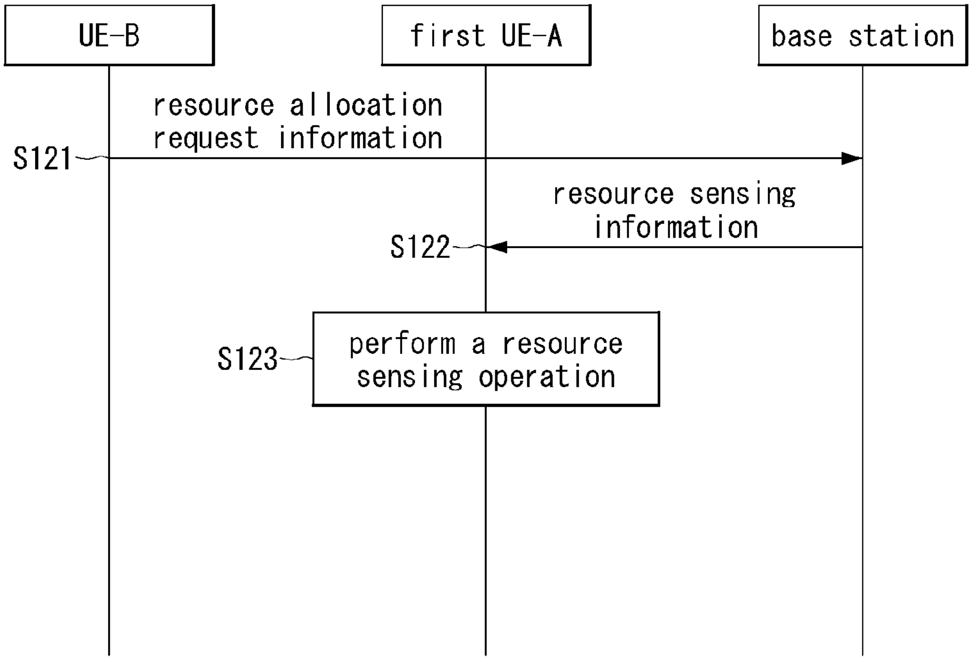
FIG. 9A is a sequence chart illustrating a third exemplary embodiment of the step S100 shown in FIG. 7.

FIG. 9A is a sequence chart illustrating a third exemplary embodiment of the step S100 shown in FIG. 7.

As shown in FIG. 9A, the step S100 may include steps S121, S122, and S123. The first UE-A may be located within a coverage of a base station. That is, communication between the first UE-A and the base station may be performed. The first UE-A may perform sidelink communication with the UE-B through a sidelink.

The UE-B may transmit a message including resource allocation request information to the base station (S121). In addition, the message transmitted in the step S121 may further include an ID of the UE-B (i.e., UE-B ID) and/or information on resource(s) (e.g., RP information) allocated to the UE-B. That is, the message may include one or more information elements defined in Table 3. In the step S121, the message may be transmitted through a Uu link between the UE-B and the base station. For example, the resource allocation request information (e.g., information element(s) included in the message) may be transmitted using at least one of higher layer signaling (e.g., MAC CE), PUCCH, or PUSCH.

When the UE-B is not connected to the base station, the UE-B may transmit the resource allocation request information to the base station in an initial access procedure with the base station. In the initial access procedure, one or more information elements defined in Table 3 may be transmitted from the UE-B to the base station. For example, one or more information elements defined in Table 3 may be transmitted through at least one of a Msg1, Msg3, or MsgA, and a Msg2, Msg4, and/or MsgB may include a response to the one or more information elements defined in Table 3. In the initial access procedure, transmission of the resource allocation request information and the response thereto may be implicitly or explicitly signaled.

The base station may receive, from the UE-B, the message including the resource allocation request information, UE-B ID and/or information on resource(s) allocated to the UE-B. The base station may generate resource sensing information based on the information element(s) received from the UE-B. The resource sensing information may include one or more information elements defined in Table 4. The first UE-A performing a resource sensing operation for resource allocation of the UE-B may be determined by the base station. The first UE-A may be a UE that assists resource allocation operations of the UE-B. The base station may transmit the resource sensing information to the first UE-A (e.g., the first UE-A determined by the base station) (S122). The resource sensing information may be transmitted through a Uu link between the base station and the first UE-A. For example, the resource sensing information may be transmitted from the base station to the first UE-A using at least one of higher layer signaling (e.g., RRC message, MAC CE), PDCCH, or PDSCH.

The first UE-A may receive the resource sensing information from the base station, and may perform a resource sensing operation for resource allocation of the UE-B based on the resource sensing information (S123). The resource sensing information may indicate to perform a resource sensing operation on an RP configured in the UE-B and/or a resource sensing operation on an RP not configured in the UE-B. In this case, the first UE-A may perform a resource sensing operation on the RP(s) based on the indication of the resource sensing information. The step S123 may be performed identically or similarly to the step S114 shown in FIG. 8A or the step S114-1 shown in FIG. 8B. The first UE-A may transmit a result of the resource sensing operation (e.g., resource set information) to the UE-B.

Figure 9B:
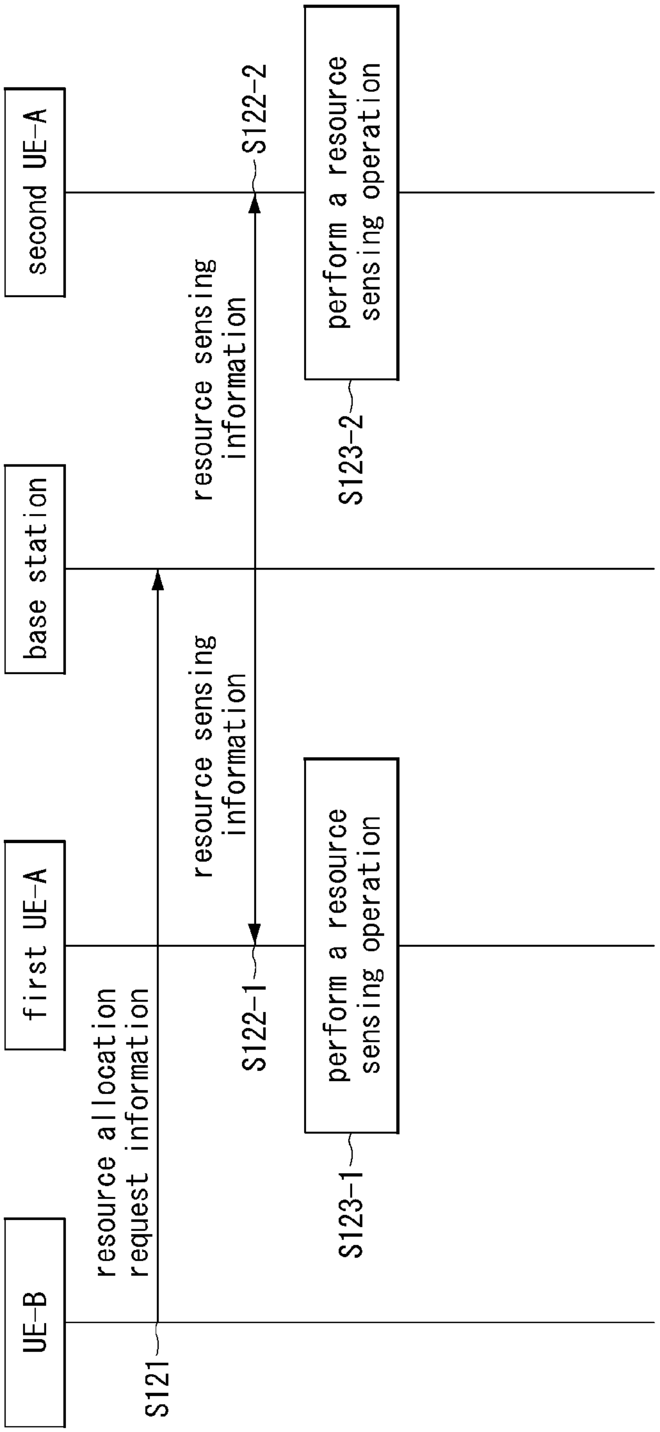
FIG. 9B is a sequence chart illustrating a fourth exemplary embodiment of the step S100 shown in FIG. 7.

FIG. 9B is a sequence chart illustrating a fourth exemplary embodiment of the step S100 shown in FIG. 7.

As shown in FIG. 9B, steps S121, S122-1, and S123-1 shown in FIG. 9B may be performed identically or similarly to the steps S121, S122, and S123 shown in FIG. 9A. The base station may transmit resource sensing information for resource allocation of the UE-B to not only the first UE-A but also the second UE-A (S122-1 and S122-2). In this case, a resource sensing operation for resource allocation of the UE-B may be performed also by the second UE-A. The resource sensing information transmitted to the first UE-A may be the same as or similar to the resource sensing information transmitted to the second UE-A. The resource sensing information transmitted to each of the first UE-A and the second UE-A may include one or more information elements defined in Table 4.

The second UE-A may perform a resource sensing operation based on the resource sensing information (S123-2). The step S123-2 may be performed identically or similarly to the step S123 shown in FIG. 9A. The first resource set information as a result of the resource sensing operation of the first UE-A and/or the second resource set information as a result of the resource sensing operation of the second UE-A may be transmitted to the UE-B. The first resource set information and/or the second resource set information may be transmitted in the same or similar manner to the step S200 shown in FIG. 7.

In the exemplary embodiment shown in FIG. 9B, a plurality of UE-As (e.g., first UE-A and second UE-B) may perform resource sensing operations. Each of the plurality of UE-As may transmit a result of the resource sensing operation (e.g., resource set information) to the UE-B when the result of the resource sensing operation satisfies a preconfigured condition. The preconfigured condition may be configured to the plurality of UE-As by the base station through higher layer signaling and/or DCI. For example, when a ratio of available resources (or the size of available resources) as the result of the resource sensing operation is greater than or equal to a threshold, the UE-A may transmit the resource set information to the UE-B. The threshold may be the 'threshold used to determine a resource use state' defined in Table 4. The radio of available resources may be defined based on a CBR and/or CR. Alternatively, the ratio of available resources may be defined as a ratio of resources determined as available resources among all resources on which the resource sensing operation has been performed.

The threshold used to determine a resource use state (e.g., a threshold of a received signal strength or a threshold of a received signal quality), time resources (e.g., time resource range) on which the resource sensing operation is performed, frequency resources (e.g., frequency resource range) on which the resource sensing operation is performed, and/or RP(s) on which the resource sensing operation is performed may be independently configured for each of the plurality of UE-As. The time resources (e.g., time resource range) on which the resource sensing operation is performed, the frequency resources (e.g., frequency resource range) on which the resource sensing operation is performed, and/or the RP(s) pm which the resource sensing operation is performed may be indicated by the 'information on resource(s) on which the resource sensing operation is to be performed' defined in Table 4. The resource sensing information for the first UE-A may be configured differently from the resource sensing information for the second UE-A. Alternatively, the resource sensing information for the first UE-A may be configured identically to the resource sensing information for the second UE-A.

Meanwhile, in the exemplary embodiments shown in FIGS. 9A and/or 9B, a plurality of UE-Bs may transmit resource allocation request information to the base station. For example, the first UE-A may transmit resource allocation request information to the base station, and the second UE-B may transmit resource allocation request information to the base station. The base station may receive the resource allocation request information of the first UE-B and the resource allocation request information of the second UE-B. In this case, the base station may select one or more UE-As to perform resource sensing operations for the UE-B(s), and instruct the selected one or more UE-As to perform the resource sensing operations for the UE-B(s).

Alternatively, the base station may select one or more UE-As to transmit results of the resource sensing operations for the UE-B(s), and instruct the selected one or more UE-As to transmit the results of the previously-performed resource sensing operations to the UE-B(s). In this case, the first UE-A may transmit the result of the previously-performed resource sensing operation (e.g., resource set information) to the UE-B(s) without performing a resource sensing operation. Here, the resource sensing information transmitted from the base station to the first UE-A may include information (e.g., IDs) of the UE-B(s) having transmitted the resource allocation request information. The first UE-A may transmit the result of the previously-performed resource sensing operation (e.g., resource set information) to the UE-B(s) indicated by the resource sensing information.

Figure 10A:
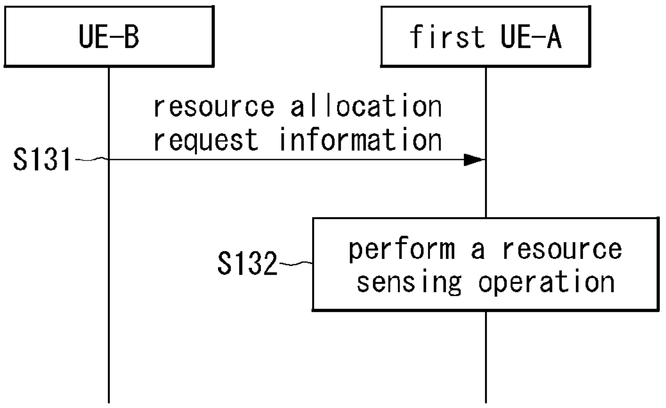
FIG. 10A is a sequence chart illustrating a fifth exemplary embodiment of the step S100 shown in FIG. 7.

FIG. 10A is a sequence chart illustrating a fifth exemplary embodiment of the step S100 shown in FIG. 7.

As shown in FIG. 10A, the step S100 may include steps S131 and S132. The UE-B may transmit a message including resource allocation request information to the first UE-A (S131). In addition, the message transmitted in the step S131 may include an ID of the UE-B (i.e., UE-B ID), information on resource(s) (e.g., RP information) allocated to the UE-B, an indicator indicating whether to perform a resource sensing operation, information on resource(s) on which the resource sensing operation is performed, and/or a threshold used to determine a resource use state. That is, the message may include one or more information elements defined in Table 3 and/or Table 4. In the step S131, the message may be transmitted through a sidelink between the UE-B and the first UE-A. For example, the resource allocation request information (e.g., information element(s) included in the message) may be transmitted using at least one of higher layer signaling (e.g., MAC CE), PSCCH, PSSCH, or PSFCH.

"The resource allocation request information (e.g., information element(s) included in the message) is transmitted through a PSCCH" may mean "first-stage SCI includes the resource allocation request information". "The resource allocation request information (e.g., information element(s) included in the message) is transmitted through a PSSCH" may mean "second-stage SCI includes the resource allocation request information". When the resource allocation request information (e.g., information element(s) included in the message) is transmitted through a PSFCH, the first UE-A may be a transmitting UE transmitting data to the UE-B, and the UE-B may perform a role of a receiving UE receiving the data from the first UE-A and a role of a transmitting UE transmitting data to another UE.

The first UE-A may receive, from the UE-B, the message including the UE-B ID, information on resource(s) (e.g., RP information) allocated to the UE-B, indicator indicating whether to perform a resource sensing operation, information on resource(s) on which the resource sensing operation is performed, and/or threshold used to determine a resource use state, and may perform the resource sensing operation based on the information element(s) included in the message (S132). The message may indicate to perform a resource sensing operation on an RP configured in the UE-B and/or a resource sensing operation on an RP not configured in the UE-B. In this case, the first UE-A may perform the resource sensing operation on the RP(s) based on the indication of the message. The step S132 may be performed identically or similarly to the step S114 shown in FIG. 8A, the step S114-1 shown in FIG. 8B, the step S123 shown in FIG. 9A, or the step S123-1 shown in FIG. 9B. The first UE-A may transmit a result of the resource sensing operation (e.g., resource set information) to the UE-B.

Figure 10B:
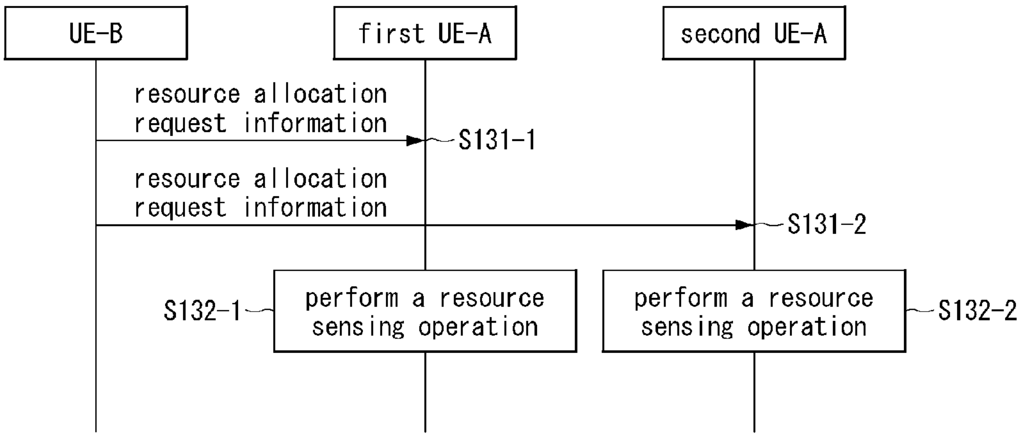
FIG. 10B is a sequence chart illustrating a sixth exemplary embodiment of the step S100 shown in FIG. 7.

FIG. 10B is a sequence chart illustrating a sixth exemplary embodiment of the step S100 shown in FIG. 7.

As shown in FIG. 10B, steps S131-1 and S132-1 shown in FIG. 10B may be performed identically or similarly to the steps S131 and S132 shown in FIG. 10A. The UE-B may transmit a message including resource allocation request information to not only the first UE-A but also the second UE-A (S131-1 and S131-2). In addition, the message transmitted in the steps S131-1 and step S131-2 may include an ID of the UE-B (i.e., UE-B ID), information on resource(s) (e.g., RP information) allocated to the UE-B, indicator indicating whether to perform a resource sensing operation, information on resource(s) on which the resource sensing operation is performed, and/or threshold used to determine a resource use state. That is, the message may include one or more information elements defined in Table 3 and/or Table 4. In the steps S131-1 and S131-2, the message may be transmitted through a sidelink between the UE-B and the first UE-A. For example, the resource allocation request information (e.g., information element(s) included in the message) may be transmitted using at least one of higher layer signaling (e.g., MAC CE), PSCCH, PSSCH, or PSFCH.

Each of the first UE-A and the second UE-A may receive, from the UE-B, the message including the UE-B ID, information on resource(s) (e.g., RP information) allocated to the UE-B, indicator indicating whether to perform a resource sensing operation, information on resource(s) on which the resource sensing operation is performed, and/or threshold used to determine a resource use state. Each of the plurality of UE-As (e.g., the first UE-A and the second UE-A) may transmit a result of the resource sensing operation (e.g., resource set information) to the UE-B when the result of the resource sensing operation satisfies a preconfigured condition. The preconfigured condition may be configured to the plurality of UE-As by the base station through higher layer signaling and/or DCI. For example, when a ratio of available resources (or the size of available resources) as the result of the resource sensing operation is greater than or equal to a threshold, the UE-A may transmit the resource set information to the UE-B. The ratio of available resources may be defined based on a CBR and/or CR. Alternatively, the ratio of available resources may be defined as a ratio of resources determined as available resources among all resources on which the resource sensing operation has been performed.

The threshold used to determine a resource use state (e.g., a threshold of a received signal strength or a threshold of a received signal quality), time resources (e.g., time resource range) on which the resource sensing operation is performed, frequency resources (e.g., frequency resource range) on which the resource sensing operation is performed, and/or RP(s) on which the resource sensing operation is performed may be independently configured for each of the plurality of UE-As. The time resources (e.g., time resource range) on which the resource sensing operation is performed, the frequency resources (e.g., frequency resource range) on which the resource sensing operation is performed, and/or the RP(s) on which the resource sensing operation is performed may be indicated by the 'information on resource(s) on which the resource sensing operation is to be performed' defined in Table 4. The resource sensing information for the first UE-A (e.g., information element(s) defined in Table 4) may be configured differently from the resource sensing information for the second UE-A. Alternatively, the resource sensing information for the first UE-A may be configured identically to the resource sensing information for the second UE-A.

Meanwhile, in the exemplary embodiment shown in FIG. 10A, the first UE-A having received the resource allocation request information may transmit the result of the previously-performed resource sensing operation to the UE-B without performing a resource sensing operation (i.e., step S132). In the exemplary embodiment shown in FIG. 10B, the first UE-A having received the resource allocation request information may transmit the result of the previously-performed resource sensing operation to the UE-B without performing a resource sensing operation (i.e., step S132-1), and the second UE-A having received the resource allocation request information may transmit the result of the previously-performed resource sensing operation to the UE-B without performing a resource sensing operation (i.e., step S132-2).

In the exemplary embodiments shown in FIGS. 10A and 10B, the first UE-A and/or the second UE-A may perform resource sensing operations on an RP configured in the UE-B and/or an RP not configured in the UE-B, and may transmit results of the resource sensing operations (e.g., resource set information) to the UE-B. The results of the resource sensing operations may be transmitted through the step S200 shown in FIG. 7. The resource set information may include information indicating the RPs (e.g., RP configured in the UE-B, RP requested by the UE-B, or RP not configured in the UE-B) on which the resource sensing operations have been performed.

The UE-specific information (e.g., information indicating the RPs on which the resource sensing operations have been performed) may be transmitted using at least one of higher layer signaling (e.g., MAC CE), PSCCH, or PSSCH (e.g., data channel, second-stage SCI). The UE-specific information and common information other than the UE-specific information may be transmitted independently. The common information may be transmitted through higher layer signaling (e.g., system information block (SIB)).

Exemplary Embodiments of Resource Allocation Request Information Transmission Methods In the exemplary embodiments shown in FIGS. 8A, 8B, 9A, 9B, 10A, and/or 10B, the UE-B may transmit the resource allocation request information. The resource allocation request information may include one or more information elements listed in Table 5 below.

TABLE 5

| |
|---|
| Information elements |
| Resource allocation request indicator |
| Threshold used for resource sensing operations |
| Information requesting reporting of preferred resource(s) or non-preferred resource(s) |

The information element(s) defined in Table 5 may be transmitted to the base station via the UE-A(s). Alternatively, the information element(s) defined in Table 5 may be directly transmitted by the UE-B to the base station. The base station may generate resource sensing information in consideration of the information element(s) defined in Table 5. When a plurality of UE-As (e.g., first UE-A and second UE-A) perform resource sensing operations, the base station may transmit the information element(s) defined in Table 5 to at least one UE-A among the plurality of UE-As.

[Exemplary Embodiments of the Step S200 shown in FIG. 7]

In the step S200 shown in FIG. 7, the UE-A may transmit a result of the resource sensing operation (e.g., resource set information) to the UE-B. The step S200 may be performed by a plurality of UE-As (e.g., first UE-A and second UE-A). That is, the plurality of UE-As may perform resource sensing operations for resource allocation of the UE-B, and may transmit the resource set information, which is the results of the resource sensing operations, to the UE-B through sidelinks. The resource set information may be transmitted through at least one of higher layer signaling (e.g., MAC CE), PSCCH, or PSSCH. The resource set information generated by each of the plurality of UE-As may include one or more information elements defined in Table 6 below.

TABLE 6

| Information elements | Contents |
|---|---|
| RP resource information | RP resource information may indicate RP index(es) (e.g., RP #1, RP #2) |
| Time-frequency resource information | Time-frequency resource information may indicate a time-frequency resource (e.g., time-frequency resource #1, time-frequency resource #2) within the RP indicated by the RP resource information |
| Preference/non-preference indicator | Preference indicator/non-preference indicator may indicate whether the time-frequency resource indicated by the time-frequency resource information is a preferred resource or a non-preferred resource |
| Threshold | Threshold may be used to determine whether the time-frequency resource indicated by the time-frequency resource information is a preferred resource or a non-preferred resource. The threshold may be a reference value of a received signal strength |

The RP resource information may indicate RP(s) on which the resource sensing operations by the UE-A(s) have been performed. The RP resource information may include configuration information for one or more RPs. The RP resource information may indicate the RP configured in the UE-B and/or the RP not configured in the UE-B. For example, the RP resource information may indicate an RP provided by a communication node that triggers the resource sensing operation and/or an RP provided by a communication node that performs the resource sensing operation. When the resource sensing operation is performed only on the RP configured in the UE-B, the resource set information may not include the RP resource information.

The time-frequency resource information may indicate a time-frequency resource on which the resource sensing operation is performed within the RP indicated by the RP resource information. A plurality of time-frequency resources may be configured within one RP, and in this case, a plurality of pieces of time-frequency resource information indicating the plurality of time-frequency resources may be generated. The time-frequency resource information may indicate only a time resource. Alternatively, the time-frequency resource information may indicate only a frequency resource. Alternatively, the time-frequency resource information may indicate only a time resource within a fixed frequency resource range. Alternatively, the time-frequency resource information may indicate only a frequency resource within a fixed time resource range. The time resource may be represented by an index of a symbol, mini-slot, slot, and/or subframe within the RP, and a frequency resource may be represented by an index of a subcarrier, subband, and/or PRB within the RP. Alternatively, the time resource may be represented as an offset from a reference point within the RP, and the frequency resource may be represented as an offset from a reference point within the RP.

The preference/non-preference indicator may indicate a preferred resource for the UE-B or a non-preferred resource for the UE-B. The preference/non-preference indicator may be interpreted as 'one indicator' or 'two indicators including a preference indicator and a non-preference indicator'. When the resource set information includes [RP resource information, time-frequency resource information, non-preference indicator], the resource set information may indicate a resource not to be used by the UE-B. When the resource set information includes [RP resource information, time-frequency resource information, preference indicator], the resource set information may indicate a resource to be used by the UE-B.

When the resource set information is configured to indicate a preferred resource or when the resource set information is configured to indicate a non-preferred resource, the resource set information may not include the preference/non-preference indicator. When the resource set information indicates a plurality of time-frequency resources, the resource set information may include a preference indicator or a non-preference indicator for each of the plurality of time-frequency resources. Alternatively, when the resource set information indicates a plurality of time-frequency resources, one preference indicator or one non-preference indicator for the plurality of time-frequency resources may be included in the resource set information.

The threshold may be used to determine an available resource (e.g., preferred resource) and/or an unavailable resource (e.g., non-preferred resource) in the resource sensing operations of the UE-A(s). The UE-B may refer to the threshold indicated by the resource set information for resource selection. The threshold may be configured for each UE-A, RP, or time-frequency resource. When the resource set information indicates a plurality of time-frequency resources, the resource set information may include a threshold used in each of the plurality of time-frequency resources. Alternatively, a common threshold may be used for the plurality of time-frequency resources. In this case, the resource set information may include information on the plurality of time-frequency resources and one common threshold.

A preference indicator and/or a non-preference indicator may be mapped to a threshold. Mapping information of [preference indicator-threshold] and/or mapping information of [non-preference indicator-threshold] may be configured, and the above-described mapping information may be included in the resource set information. A threshold mapped to a preference indicator and a threshold mapped to a non-preference indicator may be configured independently of each other. A threshold which is a criterion for determining a non-preferred resource (e.g., threshold mapped to a non-preference indicator) may be configured to be relatively high. A non-preferred resource may refer to a resource in which a signal having a received signal strength equal to or greater than a threshold is received, and when the corresponding threshold is set relatively high, reliability of the non-preferred resource may be improved. Since a signal having a high received signal strength exists in a non-preferred resource, the non-preferred resource may be determined to be an inappropriate resource (e.g., unavailable resource) for sidelink communication.

A threshold which is a criterion for determining a preferred resource (e.g., threshold mapped to a preference indicator) may be configured to be relatively low. A preferred resource may refer to a resource in which a signal having a received signal strength less than a threshold is received, and when the corresponding threshold is set relatively low, reliability of the preferred resource may be improved. Since a signal having a low received signal strength exists in a preferred resource, the preferred resource may be determined as an appropriate resource (e.g., available resource) for sidelink communication.

The mapping information of [preference indicator-threshold] and/or the mapping information of [non-preference indicator-threshold] may be defined as shown in Table 7 below.

TABLE 7

| Preference/non-preference indicator | Threshold |
|---|---|
| Preference indicator | X |
| Non-preference indicator | Y |

A threshold (e.g., X) for a preference indicator may be configured to be distinguished from a threshold (e.g., Y) for a non-preference indicator. In this case, even when the preference/non-preference indicator is not included in the resource set information, the UE-B may determine whether a resource indicated by the resource set information is a preferred resource or a non-preferred resource based on a threshold included in the resource set information. For example, when the resource set information includes the threshold X, the UE-B may determine that the resource set information indicates a preferred resource. When the resource set information includes the threshold Y, the UE-B may determine that the resource set information indicates a non-preferred resource. That is, the threshold may implicitly indicate a type (e.g., preferred or non-preferred) of a resource indicated by the resource set information.

Alternatively, the resource set information may include a preference indicator or a non-preference indicator without a threshold. In this case, the UE-B may identify a threshold used in the resource sensing operation based on a preference indicator or non-preference indicator included in the resource set information. For example, when the resource set information includes a preference indicator, the UE-B may determine that a preferred resource indicated by the resource set information is determined based on the threshold X. When the resource set information includes a non-preference indicator, the UE-B may determine that a non-preferred resource indicated by the resource set information is determined based on the threshold Y. That is, the preference/non-preference indicator may implicitly indicate a threshold used for the resource sensing operation.

One or more thresholds may be mapped to a preference indicator, and one or more thresholds may be mapped to a non-preference indicator. The threshold(s) for a preference indicator may be configured so as not to overlap with the threshold(s) for a non-preference indicator.

[Exemplary Embodiments of the step S300 shown in FIG. 7]

Case when resource set information transmitted to the UE-B includes information on preferred resources The UE-B may receive resource set information including information on preferred resources. The UE-B may select transmission resource(s) by performing a resource selection operation (e.g., random selection operation) on the preferred resources indicated by the resource set information, and use the selected transmission resource(s) to perform sidelink communication. In exemplary embodiments, the random selection operation may mean a resource selection operation.

Alternatively, the resource set information may indicate resource(s) allocated to the UE-B (e.g., preferred resource(s)). In this case, the UE-B may perform sidelink communication using resource(s) allocated by the resource set information without performing a random selection operation.

Alternatively, the UE-B may select transmission resource(s) by performing a random selection operation on the resource(s) indicated by the resource set information and resource(s) determined by a resource sensing operation performed by the UE-B, and use the selected transmission resource(s) to perform sidelink communication. The transmission resource(s) may be selected based on a threshold (e.g., threshold used in a resource sensing operation) instead of a random selection operation. The threshold used in the resource sensing operation performed by the UE-B may be configured independently of a threshold used for generating the resource set information (e.g., threshold used by the UE-A). For example, the threshold used by the UE-B may be configured differently from the threshold used by the UE-A.

In order to sufficiently provide available time-frequency resources to the UE-B, the UE-A (e.g., a communication node providing resource set information to the UE-B) may determine resource preference based on a relatively low threshold, and may transmit resource set information including information on preferred resources to the UE-B. The UE-B may determine candidate resources based on a relatively high threshold within the resources (e.g., preferred resources) indicated by the resource set information received from the UE-A, determine transmission resource(s) within the candidate resources based on a random selection operation or a threshold (e.g., sensed received signal strength), and perform sidelink communication by using the transmission resource(s).

In the above-described exemplary embodiments, a method for the UE-B to determine final transmission resources (hereinafter referred to as ‘transmission resource determination method’) may vary according to the type of resources indicated by the resource set information received by the UE-B. For example, the UE-B may determine transmission resources using at least one transmission resource determination method among the following transmission resource determination methods, and may perform sidelink communication using the transmission resources.

Transmission resource determination method #1: The UE-B may determine transmission resources by performing a random selection operation on the resources indicated by the resource set information.

Transmission resource determination method #2: The UE-B may determine the resources indicated by the resource set information as transmission resources.

Transmission resource determination method #3: The UE-B may determine transmission resources based on a result of a resource sensing operation performed by the UE-B.

Transmission resource determination method #4: The UE-B may determine transmission resources based on a random selection operation or a threshold within the resources indicated by the resource set information and the resources determined by the resource sensing operation performed by the UE-B.

The type of the resources indicated by the resource set information may implicitly indicate a transmission resource determination method. When the transmission resource determination methods #1 and/or #2 are used, the size of resources indicated by the resource set information may be defined as a specific size or a specific size factor. When the transmission resource determination method #3 is used, the UE-B may perform a resource sensing operation within a preconfigured time resource range and/or a preconfigured frequency resource range.

Alternatively, information indicating a transmission resource determination method may be explicitly indicated to the UE-B. The base station and/or UE-A(s) may explicitly indicate a transmission resource determination method to the UE-B. The information indicating a transmission resource determination method may be included in the resource set information. When there are four transmission resource determination methods, a 2-bit indicator may be used to indicate each of the four transmission resource determination methods.

A transmission resource determination method may be indicated by a combination of the type of resources indicated by the resource set information and an explicit indicator (e.g., 2-bit indicator). For example, in order to indicate the transmission resource determination method #4, the size of resources indicated by the resource set information may be defined as a specific size or a specific size factor, and an additional 1-bit indicator may be used.

When the transmission resource determination method #4 is used, a time-frequency resource range within which the UE-B performs a resource sensing operation may be configured to be a minimum range. Specifically, the UE-B may receive a periodic signal (e.g., synchronization signal). Accordingly, the UE-B may be configured to perform a resource sensing operation within a range of time-frequency resources in which sidelink-synchronization signal blocks (SL-SSBs) are transmitted. When available resources are not found by the above-described resource sensing operation, the UE-B may receive resource set information including a result of the resource sensing operation performed by the UE-A by transmitting resource allocation request information. In this case, the UE-B may select transmission resources by performing a resource selection operation (e.g., random selection operation) within the resources indicated by the resource set information, and perform sidelink communication using the transmission resources.

When available resources are found by the resource sensing operation of the UE-B, the UE-B may select transmission resources within the resources indicated by the resource set information received from the UE-A and the resources determined by the resource sensing operation of the UE-B, and perform sidelink communication using the transmission resources.

Case when resource set information transmitted to the UE-B includes information on non-preferred resources The UE-B may receive resource set information including information on non-preferred resources. In this case, the UE-B may perform a resource sensing operation on resources other than the non-preferred resources indicated by the resource set information within selectable resources, determine transmission resources among resources determined by the resource sensing operation, and perform sidelink communication using the transmission resources. Alternatively, the UE-B may select transmission resources by performing a resource selection operation (e.g., random selection operation) on the remaining resources, and may perform sidelink communication using the transmission resources.

The selectable resources may mean RP(s) configured for the resource selection operation and/or sidelink communication of the UE-B. The RP(s) may be configured in the UE-B by higher layer signaling. The RP may be an RP indicated in the transmission procedure of resource allocation request information, the transmission procedure of resource sensing information, and/or the transmission procedure of a response to the above-described information. The selectable resources may mean a range of time-frequency resources configured in the UE-B for sidelink communication, and the range of time-frequency resources may be RP(s) allocated and/or configured to the UE-B. Alternatively, the range of time-frequency resources may be a time-frequency region configured within the RP(s) allocated and/or configured to the UE-B.

Case when resource set information transmitted to the UE-B includes information on preferred resources and non-preferred resources The UE-B may receive resource set information including information on preferred resources and information on non-preferred resources. The resource set information may be received from one or more UE-As. The UE-B may determine remaining resources other than the non-preferred resources indicated by the resource set information within selectable resources, determine transmission resources by performing a random selection operation within the remaining resources and the preferred resources indicated by the resource set information, and perform sidelink communication using the transmission resources. In the random selection operation, the UE-B may preferentially select the preferred resources. Priorities of the preferred resources may be configured to be higher than priorities of the remaining resources.

Alternatively, the UE-B may determine remaining resources other than the non-preferred resources indicated by the resource set information within selectable resources, and may determine candidate resources by performing a resource sensing operation within the remaining resources. The UE-B may determine transmission resources by performing a random selection operation within the candidate resources and the preferred resources indicated by the resource set information, and may perform sidelink communication using the transmission resources. In the random selection operation, the UE-B may preferentially select the candidate resources or the preferred resources.

The UE-B may receive configuration information of a resource sensing operation and may select a resource according to a priority based on the configuration information. For example, the UE-B may identify resources having high reliability based on the threshold for the resource sensing operation performed by the UE-B and the threshold for the resource sensing operation performed by the UE-A, and preferentially select resource having high reliability.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

The foregoing descriptions of specific exemplary embodiments of the present invention have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present invention, as well as various alternatives and modifications thereof. It is intended that the scope of the present disclosure be defined by the Claims appended hereto and their equivalents.

What is claimed is:

1. A method for operating a first user equipment (UE), the method comprising:

transmitting, to a second UE, a request for inter-UE coordination (IUC) information using second-stage sidelink control information (SCI);

receiving, from the second UE, the IUC information including information on a first resource set determined based on a result of a first sensing operation performed by the second UE;

selecting a transmission resource based on the IUC information and a result of a second resource sensing operation performed by the first UE; and performing a sidelink communication using the transmission resource, wherein the IUC information is transmitted using the second-stage SCI, wherein the second-stage SCI includes an indicator that indicates the IUC information is requested, and wherein the IUC information includes at least one of information related to resource pool or an indicator that indicates whether the first resource set is preferred or non-preferred.

2. The method of claim 1, further comprising:

receiving, from a third UE information on a second resource set including a result of a third resource sensing operation performed by the third UE, wherein the third resource sensing operation is triggered by a base station that has received the request from the second UE, and the transmission resource is selected in consideration of at least one of the first resource set, the second resource set, or the result of the second resource sensing operation.

3. The method of claim 1, wherein the request includes at least one of an identifier of the first UE, information on resources allocated to the first UE, a threshold used for the first sensing operation, or information requesting reporting of whether the first resource set is preferred resource(s), or non-preferred resource(s).

4. The method of claim 1, wherein the request is transmitted to a base station through the second UE, and the first sensing operation is triggered by first resource sensing information generated by the base station based on the request.

5. The method of claim 4, wherein the first resource sensing information is transmitted from the base station to the second UE, and the first resource sensing information includes at least one of an indicator indicating whether to perform the first sensing operation, information on resources on which the first sensing operation is performed, a first threshold used to determine preferred resource(s), or a second threshold used to determine non-preferred resource(s).

6. The method of claim 1, wherein the information on the first resource set includes at least one of resource pool (RP) resource information indicating a resource pool in which the first sensing operation has been performed, time-frequency resource information indicating time-frequency resources on which the first sensing operation has been performed within the resource pool indicated by the RP resource information, a preference indicator indicating that the time-frequency resources indicated by the time-frequency resource information are preferred resource(s), a non-preference indicator indicating that the time-frequency resources indicated by the time-frequency resource information are non-preferred resource(s), a first threshold used to determine the preferred resource(s), or a second threshold used to determine the non-preferred resource(s).

7. The method of claim 6, wherein a first mapping relationship between the preference indicator and the first threshold and a second mapping relationship between the non-preference indicator and the second threshold are configured, and the first threshold is set to be distinguished from the second threshold.

8. The method of claim 6, wherein when the information on the first resource set not including the preference indicator and the non-preference indicator includes the first threshold, the time-frequency resources indicated by the information on the first resource set are determined as the preferred resource(s), and when the information on the first resource set not including the preference indicator and the non-preference indicator includes the second threshold, the time-frequency resources indicated by the information on the first resource set are determined as the non-preferred resource(s).

9. A first user equipment (UE) in a wireless communication system, the first UE comprising:

at least one transceiver;

at least one processor; and at least one memory operably coupled to the at least one processor and storing instructions that, based on being executed by the at least one processor, controls the UE to perform operations comprising:

transmitting, to a second UE, a request for inter-UE coordination (IUC) information using second-stage sidelink control information (SCI);

receiving, from the second UE, the IUC information includes information on a first resource set determined based on a result of a first resource sensing operation performed by the second UE;

selecting a transmission resource based on the IUC information and a result of a second resource sensing operation performed by the first UE; and performing a sidelink communication using the transmission resource, wherein the IUC information is transmitted using the second-stage SCI, wherein the second-stage SCI includes an indicator that indicates the IUC information is requested, and wherein the IUC information includes at least one of information related to resource pool or an indicator that indicates whether the first resource set is preferred or non-preferred.

10. The first UE of claim 9, wherein the operations further comprises, receiving, from a third UE, information on a second resource set including a result of a third resource sensing operation performed by the third UE, wherein the third resource sensing operation is triggered by a base station that has received the request from the second UE, and the transmission resource is selected in consideration of at least one of the first resource set, the second resource set, or the result of the second resource sensing.

11. The first UE of claim 9, wherein the request includes at least one of an identifier of the first UE, information on resources allocated to the first UE or a threshold used for the first resource sensing operation, information requesting reporting of whether the first resource set is preferred or non-preferred.

12. The first UE of claim 9, wherein the request is transmitted to a base station through the second UE, and the first resource sensing operation is triggered by first resource sensing information generated by the base station based on the request.

13. The first UE of claim 12, wherein the first resource sensing information is transmitted from the base station to the second UE, and the first resource sensing information includes at least one of an indicator indicating whether to perform the first resource sensing operation, information on resources on which the first resource sensing operation is performed, a first threshold used to determine preferred resource(s), or a second threshold used to determine non-preferred resource(s).

14. The first UE of claim 9, wherein the information on the first resource set includes at least one of, time-frequency resource information indicating time-frequency resources on which the first resource sensing operation has been performed within the resource pool, a preference indicator indicating that the time-frequency resources indicated by the time-frequency resource information are preferred resource (s), a non-preference indicator indicating that the time-frequency resources indicated by the time-frequency resource information are non-preferred resource(s), a first threshold used to determine the preferred resource(s), or a second threshold used to determine the non-preferred resource(s).

* * * * *